United States Patent [19]
Popken

[11] 3,901,534
[45] Aug. 26, 1975

[54] CONVERTIBLE BACK REST-LUGGAGE RACK COMBINATION FOR MOTORCYCLES OR SIMILAR VEHICLES

[76] Inventor: Robert E. Popken, 768 Chamberlain Pl., Webster Groves, Mo. 63119

[22] Filed: Oct. 23, 1973

[21] Appl. No.: 408,319

[52] U.S. Cl. ............. 280/289; 297/DIG. 9; 297/92; 224/31
[51] Int. Cl.² ......................... B62J 1/28; B62J 7/04
[58] Field of Search ........... 280/289, 202; 296/78.1; 297/366, DIG. 9, 92, 243, 331, 377, 353, 366, 373, 352, 252; 224/31, 39

[56] References Cited
UNITED STATES PATENTS

| | | | |
|---|---|---|---|
| 878,889 | 2/1908 | Miller | 297/352 |
| 1,033,156 | 7/1912 | Conboy | 297/DIG. 9 |
| 1,102,899 | 7/1914 | Fox | 297/92 |
| 1,113,833 | 10/1914 | Ruff | 297/353 |
| 1,121,580 | 12/1914 | Burkett et al. | 297/92 |
| 1,146,675 | 7/1915 | Weed | 297/DIG. 9 |
| 1,367,981 | 2/1921 | Lawrence | 297/DIG. 9 |
| 1,380,934 | 6/1921 | Speer | 297/DIG. 9 |
| 3,368,847 | 2/1968 | Langmead | 297/366 |

*Primary Examiner*—Kenneth H. Betts
*Assistant Examiner*—Jack D. Rubenstein
*Attorney, Agent, or Firm*—Gail S. Soderling

[57] ABSTRACT

A U-shaped frame pivotably mounted at the lower rear of a vehicle seat, can be locked in a vertical position to serve as a back rest or folded rearwardly to a horizontal position to serve as a luggage carrier.

4 Claims, 6 Drawing Figures

PATENTED AUG 26 1975    3,901,534

CONVERTIBLE BACK REST-LUGGAGE RACK COMBINATION FOR MOTORCYCLES OR SIMILAR VEHICLES

BACKGROUND OF THE INVENTION

This invention relates to luggage rack and backrest combinations for vehicles.

Convertible backrest-seat combinations attached to the frame of bikes, motorcycles, etc. are known, examples being disclosed in U.S. Pat. Nos. 1,102,899; 1,216,029; 1,074,438; and 3,549,172. The prior art devices include a large number of parts, making them expensive to produce and time-consuming to assemble. In addition the prior art backrest seats are not designed so that they can be converted quidkly and easily from a horizontal to vertical position while the vehicle is in motion.

SUMMARY OF THE INVENTION

The present invention provides a simple, inexpensive, easily assembled backrest-luggage rack for motorcycles and vehicles having a saddle seat. The device, which comprises a U-shaped frame member pivotably connected to brackets attached to the vehicles frame near the rear of the seat, is quickly and easily converted from a vertical backrest position to a horizontal luggage rack position. The backrest-luggage rack of this invention is easily attached to a vehicle frame, inexpensive, and provides a comfortable backrest.

BRIEF DESCRIPTION OF THE DRAWING

A further understanding may be had by reference to the accompanying drawing in which like numbers refer to like parts in the several views and in which.

DESCRIPTION OF THE PREFERRED EMBODIMENTS

Figure 1:
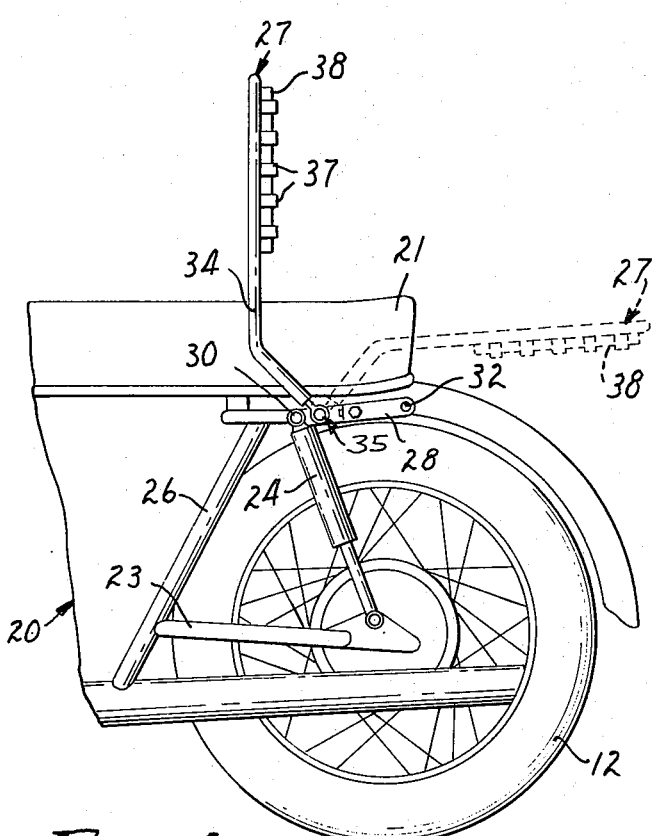
FIG. 1 is a side view of the rear portion of a motorcycle with a backrest-luggage rack of this invention, comprising a U-shaped frame attached to the motorcycle frame.
Figure 2:
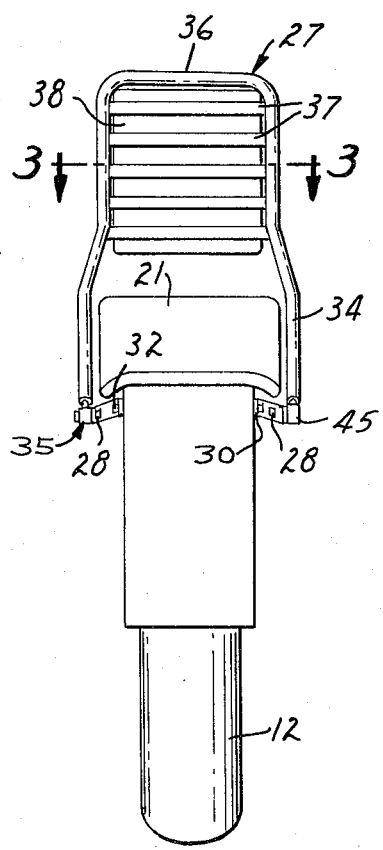
FIG. 2 is a rear view of the device shown in FIG. 1.

Referring to the accompanying drawing and initially to FIGS. 1 and 2, the rear supporting structure of a motorcycle 20, rear wheel 12, fork 23, and shock absorber 24, support the rear portion of frame 26 and seat 21. Luggage rack 27 is shown held in the vertical, backrest, position for supporting a rider with the horizontal, luggage holding, position of the rack shown by phantom lines 27'. Mounting brackets 28 are attached to frame 26 at 30, 32. One end of the bracket 28 is mounted to the frame at 30 at the shock absorber and the other end is mounted to the fender at 32. A pair of spaced legs 34 of U-shaped frame 36 are rotatably mounted to studs 29 protruding from the brackets 28 by means 33, 35. Brackets 28 are shown as one-piece; however, in order to make the brackets adaptable to a variety of vehicles they could be made in several pieces providing an adjustable bracket.

Figure 3:
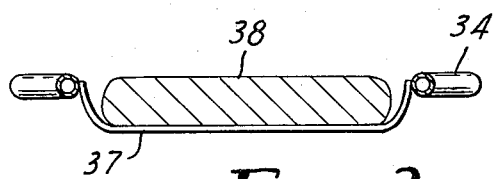
FIG. 3 is a cross-sectional view of the device shown in FIG. 2, taken along section line 3 — 3 looking in the direction of the arrows.

In one embodiment, cushion 38 is attached to frame 36 by cross members 37 and is recessed between spaced legs 34 as shown in FIG. 3 so when the combination backrest-luggage rack is in the horizontal position any load rests primarily against spaced legs 34; however, the cushion may protrude forward of the legs or be eliminated entirely. Cushion 38 may be formed of foamed material, e.g., from rubber, polymeric foams, or other suitable cushioning materials. The cushion should be soft enough to provide a comfortable backrest for the rider of the vehicle but firm enough to withstand the stresses of carrying a load.

Figure 4:
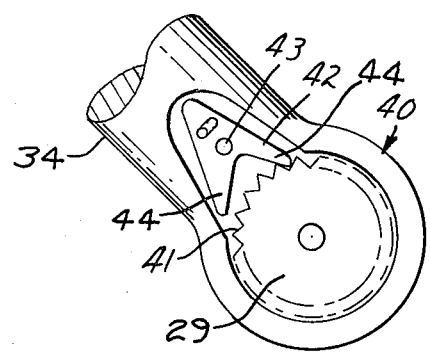
FIG. 4 is a cross-sectional view of a ratchet with about a 90° rotation useful for mounting said rack on said bracket.

FIG. 4 shows one rotatable means for mounting spaced legs 34 to a protruding stud 29 attached to bracket 28. Ratchet 40 has teeth 41 and pawl 42 which engages the teeth. By rotating pawl 42 about shaft 43 either of the detents 44 can be brought into contact with teeth 41 thereby allowing motion in only one direction and holding frame 36 in a fixed position until the pawl is moved. As shown ratchet 40 is rotatable only in the counterclockwise direction. When the other detent is rotated into contacts with teeth 41 the ratchet would be rotatable in the clockwise direction. The angle of rotation of ratchet 40 will generally be about 90°, as shown, but may be larger or smaller depending on the angle of rotation dictated by the bracket position and size of the particular vehicle.

Figure 5:
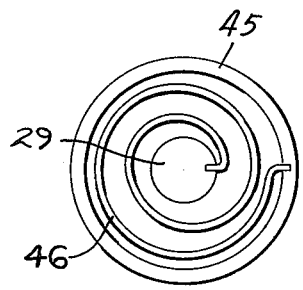
FIG. 5 is a cross-sectional view of a means for rotatably mounting the backrest-luggage rack on a bracket.

FIG. 5 shows another means for rotatably mounting one leg of frame 36 to the stud protruding from brackets 28. Housing 45 is attached to one of the legs 34 and contains coil spring 46 attached to housing 45 and stud 29 which is attached to a bracket 28. Spring 46 is coiled so that as frame 36 is rotated from the horizontal to the vertical position the spring is being more tightly wound providing a mild restraining force which in turn tends to urge the luggage rack-backrest into the horizontal position and prevent the frame from unexpectedly moving to the vertical position.

Figure 6:
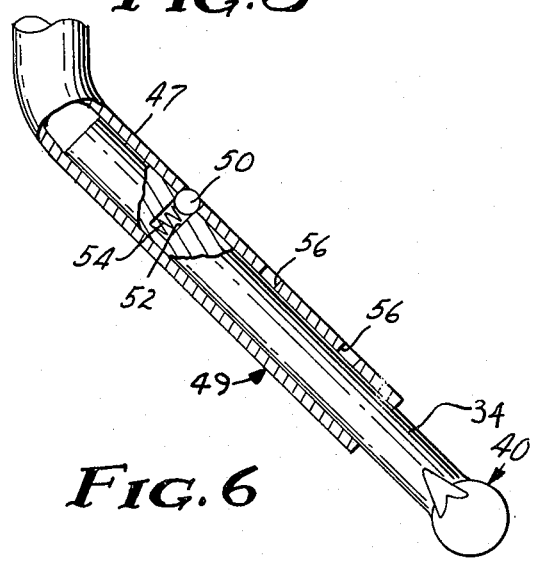
FIG. 6 is a view in partial section of an adjustable leg of a U-frame useful in the practice of this invention.

The U-shaped frame could be made from strip steel but motorcycle riders vary markedly in size and an adjustable portion in the legs of the U-shaped frame allows the rider to adjust the backrest to a comfortable position. FIG. 6 shows one such adjustable leg 49 having an outer tube 47 and an inner tube 48 adapted to slide longitudinally within the outer tube in a telescopic manner. Inner tube 48 carries spring loaded ball 50 in cavity 52. The ball in its extended position holds the inner and outer tubes in an extended position. To adjust leg 46 ball 50 is depressed into cavity 52 compressing spring 54 and inner tube 48 moved within outer tube 47 until the ball comes to rest in one of the plurality of apertures 56 in outer tube 47.

In a further embodiment the legs of frame 36 could be provided with rotating means near the center of the legs, allowing the cushion portion of the backrest to be moved to the vertical position near the back of seat 21, providing a backrest for a passenger seated behind the driver in addition to being suitable as a backrest for the driver or a luggage rack.

What is claimed is:

1. A combination back rest and luggage rack device adapted for attachment to a motorcycle or other vehicle of the type having a saddle seat, comprising in combination:

a pair of mounting brackets adapted for mounting on the frame of said vehicle of the type described, one bracket being disposed on each side of said seat at a location below and at the rear of the seat, both ends of said brackets being attached to the frame of said vehicle each of said brackets comprising a mounting plate having a stud protruding from one face thereof at a point between said ends of said bracket, said stud having an axis perpendicular to said plate, a generally U-shaped frame comprising a pair of legs joined at one end, said legs being adapted to straddle the rear of the seat, and at the other end of each leg a terminal portion, rotating means attached to the terminal portion of said legs for mounting said U-shaped frame to said studs so that said U-shaped frame can be rotated about the axis of said studs, cross members spanning said legs and connected thereto in the portion of said frame adjacent the closed end, cooperative means associated with said rotating means and said stud to permit holding said U-shaped frame in either a generally vertical position or a generally horizontal position as desired, whereby said device can be employed in a generally vertical position as a back rest for a rider of the vehicle or in a generally horizontal position as a load supporting luggage rack.

2. The combination of claim 1, where a pad is mounted on said cross members and substantially between said legs.

3. The combination of claim 1, where one of said cooperative means is a ratchet mechanism.

4. The combination of claim 1, where said legs are adjustable.

* * * * *